J. C. Cook,
Atomizer.
No. 99,408.  Patented Feb. 1, 1870.
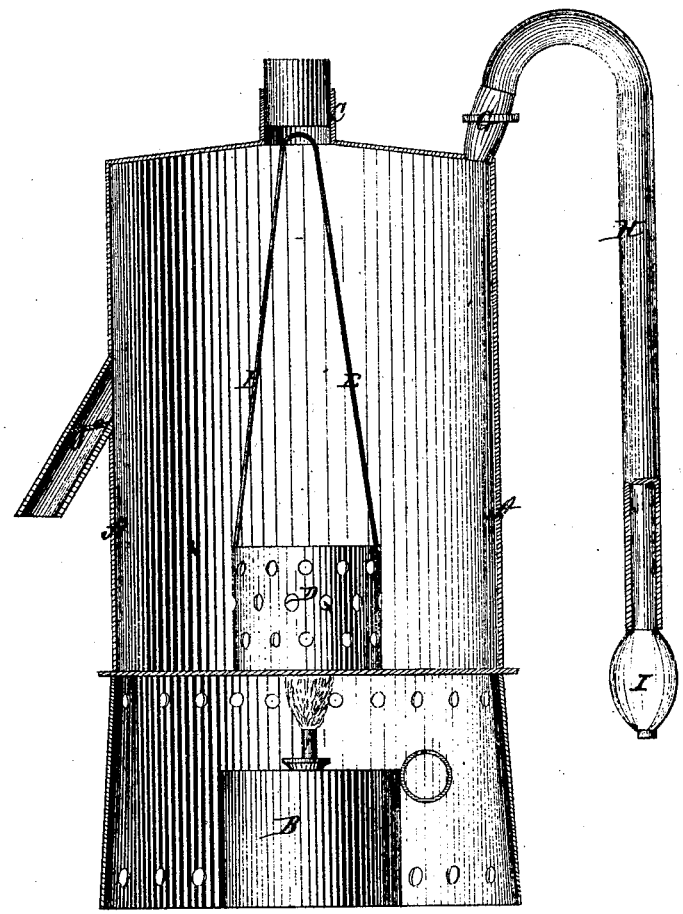
Witnesses
F. Schmann
C. L. Evert
Inventor
J. C. Cook
per Alexander Mason
Attys.

United States Patent Office.

J. C. COOK, OF NEW HAVEN, CONNECTICUT.

Letters Patent No. 99,408, dated February 1, 1870.

IMPROVED APPARATUS FOR ADMINISTERING MEDICATED VAPORS.

The Schedule referred to in these Letters Patent and making part of the same

*To all whom it may concern:*

Be it known that I, J. C. COOK, of New Haven, in the county of New Haven, and in the State of Connecticut, have invented certain new and useful Improvements in Vaporometers; and do hereby declare that the following is a full, clear, and exact description thereof, reference being had to the accompanying drawings, and to the letters of reference marked thereon, making a part of this specification.

The nature of my invention consists in the construction and arrangement of a "vaporometer"—that is, a machine or device for forming medicated vapors for inhalation.

In order to enable others skilled in the art to which my invention appertains, to make and use the same, I will now proceed to describe its construction and operation, referring to the annexed drawing, which shows a vertical section of my invention.

A represents the tank, under the bottom of which the spirit-lamp B is placed, for the purpose of heating the water in the tank.

A certain amount of water is placed, through the orifice C at the top, in the tank, so as to leave a partial vacuum in the upper part of the tank, in which vacuum the vapor is formed.

In the bottom of the tank A is placed a perforated cup, D, provided with wires or handles, E, which cup is filled with any suitable material for medicating the vapor.

In the top of the tank is a faucet, G, for the purpose of allowing the vapor to pass out, or be shut off, at will.

To this faucet is attached a flexible pipe or hose, H, having at its other end a mouth-piece, I, through which the vapor is inhaled.

On the side of the tank A is an opening or pipe, J, leading into the vacuum above the water, through which opening the air is allowed to pass in and fill said vacuum.

This opening or pipe should be provided with a valve, *a*, so constructed that the air can pass freely into the tank, while the vapor is prevented from escaping through the same.

Having thus fully described my invention,

What I claim as new, and desire to secure by Letters Patent, is—

The combination of the tank A, perforated receptacle D, flexible pipe H, and pipe J, with valve *a*, all constructed and arranged as described, for the purpose of vaporizing medicines into a vacuum, and allowing the air to unite therewith, to form a medicated vapor, substantially as herein set forth.

In testimony that I claim the foregoing, I have hereunto set my hand, this 28th day of September, 1869.

J. C. COOK.

Witnesses:
 GEO. W. OSBORN,
 CHAS. S. A. DAVIS.